April 24, 1962 R. A. HENLE 3,031,584
LOGICAL CIRCUITS USING JUNCTION TRANSISTORS
Filed June 28, 1955 2 Sheets-Sheet 1
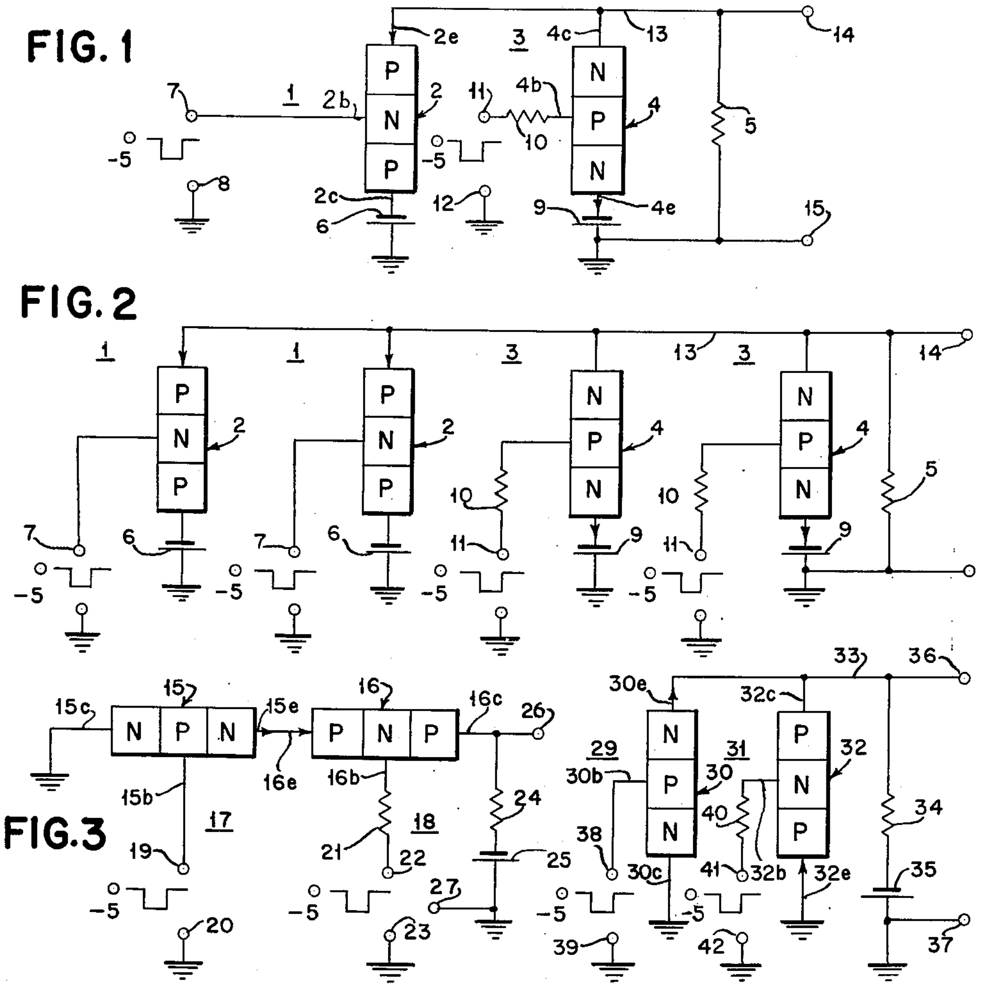
FIG. 1, FIG. 2, FIG. 3
FIG. 4
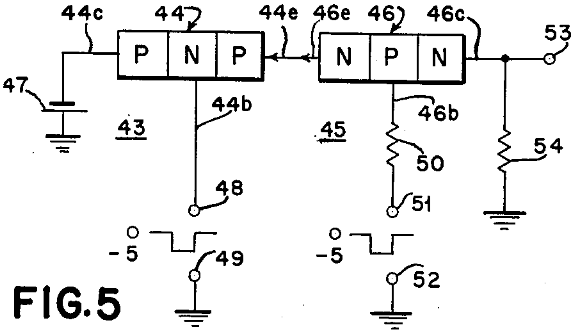
FIG. 5
INVENTOR.
ROBERT A. HENLE
BY [signature]
ATTORNEY April 24, 1962 R. A. HENLE 3,031,584

LOGICAL CIRCUITS USING JUNCTION TRANSISTORS

Filed June 28, 1955 2 Sheets-Sheet 2

INVENTOR.
ROBERT A. HENLE
BY
ATTORNEY

United States Patent Office 3,031,584
Patented Apr. 24, 1962

3,031,584

LOGICAL CIRCUITS USING JUNCTION TRANSISTORS

Robert A. Henle, Hyde Park, N.Y., assignor to International Business Machines Corporation, New York, N.Y., a corporation of New York Filed June 28, 1955, Ser. No. 518,620
15 Claims. (Cl. 307—88.5)

This invention relates to logical circuits using junction transistors as translating devices.

A logical circuit may be defined as one having a plurality of inputs and a single output, and producing a signal at the output only in response to input signals at a predetermined combination of the plurality of inputs. One common type of logical circuit is known as an AND circuit and produces an output signal whenever input signals are received simultaneously at all the inputs. Another common type of logical circuit is termed an OR circuit and produces an output signal whenever an input signal is received at any one of a plurality of inputs. It is well known that any circuit structure which can perform the AND function can also perform the OR function, the difference residing only in the logical significance which is arbitrarily assigned to the various values of input signal potentials.

The circuits disclosed include, besides an AND circuit and an OR circuit, certain circuits which are referred to as AND NOT and OR NOT circuits.

An AND NOT circuit may be defined as one which produces an output signal in response to the presence of an input signal at one or more input terminals concurrently with the absence of an input signal at another one or more of the input terminals.

An OR NOT circuit may be defined as one which produces an output signal in response either to the presence of an input signal at one or more input terminals or to the absence of an input signal at another one or more of the input terminals.

An object of the present invention is to provide improved logical circuits.

Another object is to provide improved AND NOT circuits.

Another object is to provide improved OR NOT circuits.

Another object is to provide improved AND and OR circuits.

The foregoing and other objects of the invention are attained in the circuits described herein. Those circuits which involve a NOT function include both emitter follower and inverter stages, connected so as to have a common load. The emitter follower stages are connected to what may be termed the positive inputs and the inverter stages are connected to the negative inputs. Output signals are then produced when a signal is received at the positive input and/or signals are absent at the negative input.

In the AND and OR circuits herein disclosed, a plurality of grounded base stages are connected to a common load, the output being connected to the load and the respective inputs being connected to the inputs of the several stages.

Other objects and advantages of the invention will become apparent from a consideration of the following description and claims, taken together with the accompanying drawings.

In the drawings:

FIG. 1 is an electrical wiring diagram of an AND NOT circuit embodying the invention;

FIG. 2 is an electrical wiring diagram of an AND NOT circuit similar to FIG. 1, but having a larger number of inputs;

FIG. 3 is an electrical wiring diagram of another type of AND NOT circuit embodying the invention;

FIG. 4 is an electrical wiring diagram of an OR NOT circuit embodying the invention;

FIG. 5 is an electrical wiring diagram of a modified form of OR NOT circuit embodying the invention;

FIGS. 1 AND 2

Figure 6:
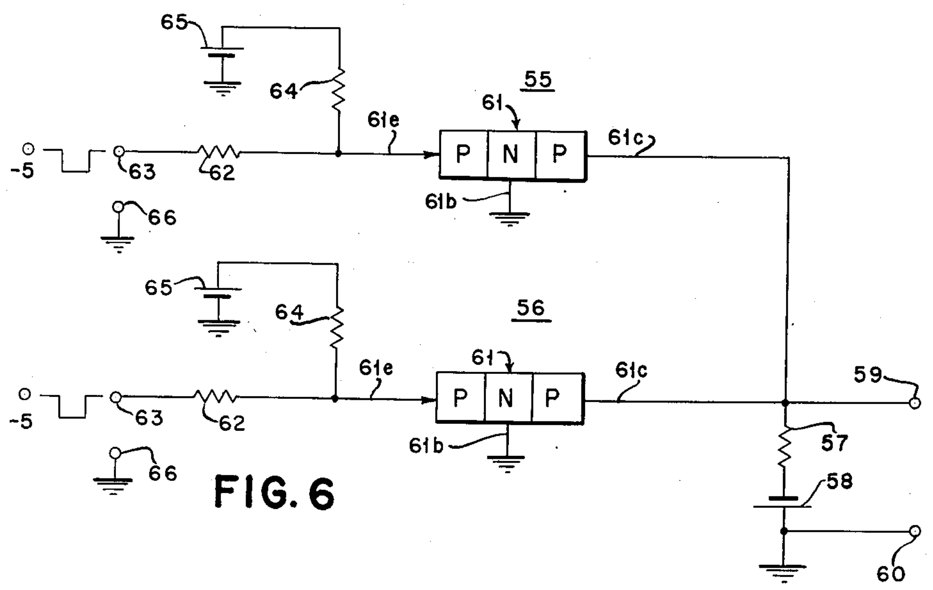
FIG. 6 is an electrical wiring diagram of an OR circuit embodying the invention.
Figure 7:
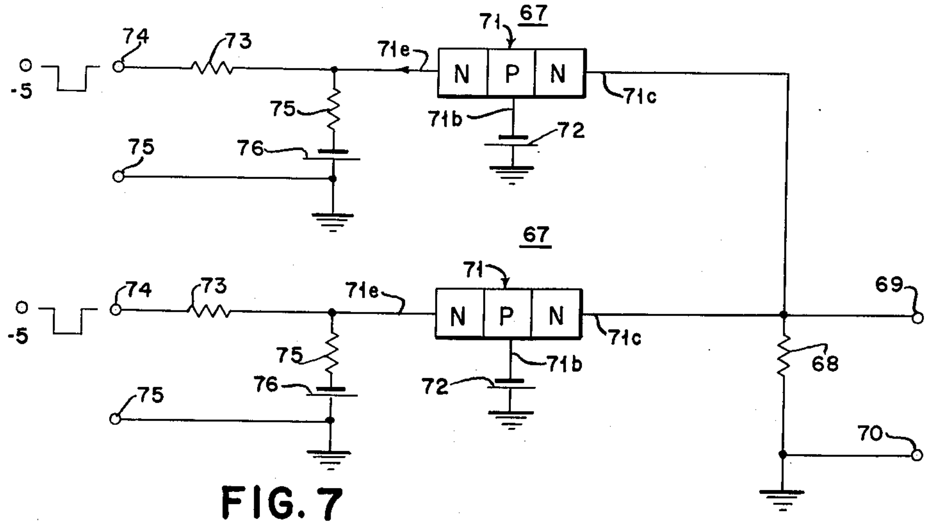
FIG. 7 is an electrical wiring diagram of an AND circuit embodying the invention.

FIG. 1 shows an AND NOT circuit including an emitter follower stage generally indicated at 1 and including a PNP junction transistor 2, and an inverter stage generally indicated at 3 and including an NPN junction transistor 4, both stages being connected in parallel to a common load resistor 5.

The transistor 2 has an emitter 2*e*, a base 2*b* and a collector 2*c*. Collector 2*c* is connected to the negative terminal of a battery 6 whose positive terminal is connected to ground. Base 2*b* is connected to a signal input terminal 7 whose cooperating signal input terminal 8 is grounded.

Transistor 4 has an emitter electrode 4*e*, a base 4*b*, and a collector 4*c*. Emitter 4*e* is connected to the negative terminal of a battery 9, whose positive terminal is grounded. Base 4*b* is connected through a resistor 10 to a signal input terminal 11, whose cooperating signal input terminal 12 is grounded.

Emitter 2*e* and collector 4*c* are connected through a wire 13 to an output terminal 14 and to one terminal of the load resistor 5, whose opposite terminal is connected to ground and also to an output terminal 15.

The emitter follower stage 1 is similar to the emitter follower disclosed and claimed in the copending patent application of George D. Bruce et al., No. 459,382, filed Sept. 30, 1954, now Patent No. 2,888,578 granted May 26, 1959. The inverter stage is generally similar to that shown and claimed in the copending application of George D. Bruce et al., No. 459,322, filed September 30, 1954, now Patent No. 2,891,172 granted June 16, 1959.

OPERATION OF FIG. 1

By way of example, specific potential values are assigned in the following description. The ungrounded input terminals 7 and 11 are considered to swing between a no signal potential of 5 volts and a signal potential of —0 volts. The output terminal 14 similarly swings between a no signal potential of —5 volts and a signal potential of 0 volts. The batteries 6 and 9 have terminal potentials of 5 volts.

Whenever the emitter of a PNP transistor, such as transistor 2, is more positive than the base, it exhibits a very low impedance from emitter to base, so that the emitter can never be more than a few tenths of a volt more positive than the base. Consequently, when input terminal 7 is at its no signal value of —5 volts, the emitter 2*e* is necessarily only slightly more positive, and hence output terminal 14 is likewise at its no signal potential of —5 volts. When input terminal 7 is at 0 volts, the emitter 2*e* may be either at zero volts or at —5 volts, depending upon the condition of the inverter stage 3.

In the inverter stage 3, the transistor 4 has a low impedance between collector 4*c* and emitter 4*e* whenever the base 4*b* is more positive than the emitter 4*e*, which occurs when the terminal 11 is at 0 volts, since the emitter 4*e* is tied to —5 volts at battery 9. Consequently, when signal input terminal 11 is at 0 volts, collector 4*c* is necessarily at —5 volts. This holds true regardless of the condition in the emitter follower stage 1.

When signal input terminal 11 is at —5 volts, then the transistor 4 represents a high impedance between collector 4c and emitter 4e, so that collector 4c may be at either 0 or —5 volts, depending upon the conditions at emitter 2e of transistor 2.

The various possible combinations of input signals at terminals 7 and 11 and the corresponding signals at output terminal 14 are summarized in the following table:

*Table I*

| | | | | |
|---|---|---|---|---|
| Input terminal 7 | −5 | −5 | 0 | 0 |
| Input terminal 11 | 0 | −5 | 0 | −5 |
| Output terminal 14 | −5 | −5 | −5 | 0 |

From the table, it may be seen that output terminal 14 shifts from its no signal value of —5 volts, to its signal value of 0 volts only when an input signal is received at terminal 7, and no input signal is received at terminal 11.

FIG. 2

This circuit is essentially the same as that of FIG. 1, except that it employs two emitter follower stages 1, and two inverter stages 3. It produces a signal at output terminal 14 only when all the input terminals 7 are at their signal values (0 volts) and all the input terminals 11 are at their no signal values (—5 volts). The various elements in the circuit of FIG. 2 correspond to their counterparts in the circuit of FIG. 1, and have been given the same reference numerals. They will not be further described.

FIG. 3

This figure illustrates a somewhat different circuit configuration which can perform the AND NOT function.

This circuit includes an NPN junction transistor 15 and a PNP junction transistor 16. Transistor 15 is connected in an emitter follower stage generally indicated at 17 and transistor 16 is connected to an inverter stage generally indicated at 18. Transistor 15 has an emitter 15e, a base 15b, and a collector 15c. Transistor 16 has an emitter 16e, a base 16b, and a collector 16c. The emitters 15e and 16e are connected together. Base 15b is connected to a signal input terminal 19 whose cooperating signal input terminal 20 is grounded. Collector 15c is connected to ground. Base 16b is connected through a resistor 21 to a signal input terminal 22 whose cooperating input terminal 23 is grounded. Collector 16c is connected through a load resistor 24 and a battery 25 to ground. Collector 16c is also connected to an output terminal 26 whose cooperating output terminal 27 is grounded.

OPERATION OF FIG. 3

Using the same exemplary values for no signal (—5 volts) and signal (0 volts) potentials, as in the case of FIG. 1, the emitter follower stage 17 may have its emitter at ground potential only when its base 15b is at ground potential and hence only when a signal is received at input terminal 19. Inverter 18, however, operates inversely to the inverter 3 of FIG. 1, since it employs a PNP transistor. It therefore presents a high impedance between its collector 16c and its emitter 16e when its base 16b is at 0 volts and presents a low impedance when the base 16b is at —5 volts. The output terminal 26 is normally at —5 volts, since it is connected to the negative terminal of battery 25. It is switched to its signal potential of 0 volts only when a signal (0 volts) is received at input terminal 19 and when transistor 16 is in its low impedance condition, i.e. when input terminal 22 is at its no signal potential of —5 volts. In this condition, both transistors are ON and conducting substantial current. The operation of this circuit of FIG. 3 may be summarized by the following table:

*Table II*

| | | | | |
|---|---|---|---|---|
| Input terminal 19 | −5 | −5 | 0 | 0 |
| Input terminal 22 | 0 | −5 | 0 | −5 |
| Output terminal 26 | −5 | −5 | −5 | 0 |

FIG. 4

FIG. 4 is a wiring diagram of an OR NOT logical circuit. This circuit comprises an emitter follower stage 29 including an NPN junction transistor 30 and an inverter stage 31 including a PNP junction transistor 32, the stages being connected in parallel to a common load resistor 34.

Transistor 30 has an emitter 30e, a base 30b and a collector 30c. Transistor 32 has an emitter 32e, a base 32b, and a collector 32c.

Emitter 30e and collector 32c are connected through a wire 33, a load resistor 34 and a battery 35 to ground. Wire 33 is also connected to an output terminal 36 having a cooperating output terminal 37 connected to ground. Emitter 32e and collector 30c are connected to ground. Base 30b is connected to an input terminal 38 whose cooperating input terminal 39 is grounded. Base 32b is connected through a resistor 40 to an input terminal 41 whose cooperating input terminal 42 is grounded.

OPERATION OF FIG. 4

When a NPN transistor such as transistor 30 is connected as an emitter follower, emitter 30e can never be more than a few tenths of a volt more negative than the base. Consequently, when input terminal 38 is at ground potential, emitter 30e must be at ground potential, and output terminal 36 must likewise be at ground potential. When input terminal 38 goes to —5 volts, then emitter 30e tends to follow to —5 volts, but may be held at 0 volts, depending upon the condition of the inverter stage 31.

In the inverter stage 31, PNP transistor 32 has a high impedance from collector to emitter when input terminal 41 is at ground potential. When input terminal 41 is at —5 volts, the transistor 32 has a low impedance from collector to emitter, since the emitter 32e is then biased positive with respect to the base. The operation of the circuit of FIG. 4 is summarized in the following table:

*Table III*

| | | | | |
|---|---|---|---|---|
| Input terminal 38 | −5 | −5 | 0 | 0 |
| Input terminal 41 | 0 | −5 | 0 | −5 |
| Output terminal 36 | −5 | 0 | 0 | 0 |

It may be seen from Table III that output terminal 36 is at its signal potential (0 volts) either when input terminal 38 is at its signal potential (0 volts) or when input terminal 41 is at its no signal potential (—5 volts).

In other words, an output signal is produced when a positive signal is received at input terminal 38 or when no input signal is received at input terminal 41, or both.

FIG. 5

This figure illustrates a different circuit configuration for producing the OR NOT circuit. FIG. 5 includes an emitter follower stage 43 including a PNP junction transistor 44, connected in series with an inverter stage 45 including an NPN junction transistor 46.

Transistor 44 has an emitter 44e, a base 44b and a collector 44c. Transistor 46 has an emitter 46e, a base 46b and a collector 46c. The emitters 44e and 46e are connected together. Collector 44c is connected through a battery 47 to ground. Base 44b is connected to an input terminal 48 whose cooperating input terminal 49 is grounded. Base 46b is connected through a resistor 50 to an input terminal 51 whose cooperating input terminal 52 is grounded. Collector 46c is connected to an output terminal 53, and is also connected through a load resistor 54 to ground.

OPERATION OF FIG. 5

In the emitter follower stage 43, the emitter 44e can never be more than slightly more positive than the base 44b. Consequently, when the base 44b is at —5 volts, the emitter 44e must be at —5 volts. When the base 44b is at 0 volts, the emitter 44e may be either at 0 or —5 volts, depending upon the condition of the inverter stage 45. The inverter stage 45 has a high impedance from collector to emitter when the input terminal 51 is at —5 volts. Hence, at such times there is substantially no current flow through resistor 54, and terminal 53 remains substantially at 0 volt. When terminal 51 is at 0 volt, the impedance from collector 46*c* to emitter 46*e* may be high or low, depending upon the potential at emitter 44*e*. The impedance from collector to emitter of 46 can not be low until base current flows and base current will not flow until emitter 46*e* goes to —5 volts by virtue of terminal 40 being at —5 volts.

The operation of the circuit of FIG. 5 may be summarized in the following table:

*Table IV*

| | | | | |
|---|---|---|---|---|
| Input terminal 48 | −5 | −5 | 0 | 0 |
| Input terminal 51 | 0 | −5 | 0 | −5 |
| Output terminal 53 | −5 | 0 | 0 | 0 |

From the table, it will be apparent that a signal (0 volt) is produced at output terminal 53 either when a signal (0 volt) is present at input terminal 48 or when no signal (—5 volts) is present at input terminal 51.

FIG. 6

This figure shows a wiring diagram for an OR circuit comprising two grounded base stages 55 and 56 connected in parallel to a common load 57 and a load supply battery 58. An output terminal 59 is connected to the terminal of resistor 57 opposite to the battery 58 and a cooperating output terminal 60 is grounded.

The two grounded base input stages are similar, each comprising a PNP junction transistor 61 having an emitter 61*e*, a base 61*b*, and a collector 61*c*. The collectors 61*c* are connected in parallel to the resistor 57. Bases 61*b* are grounded. Each emitter 61*c* is connected through a resistor 62 to an input terminal 63 and is also connected through a resistor 64 to a biasing battery 65.

OPERATION OF FIG. 6

In each of the grounded base stages, the transistor has a low impedance from collector to base when the emitter is positive with respect to the bases, and a high impedance from collector to base when the emitter is negative with respect to the base. The emitter is biased positive by the battery 65. When either input terminal 63 is at its no signal potential (—5 volts), then the positive bias is overcome, and its associated transistor 61 is cut off. When either input terminal 63 goes to 0 volt, then its transistor 61 conducts and a substantial current flows from battery 68 through resistor 67, swinging the potential of output terminal 59 from —5 to 0.

This is typical OR circuit operation, in that a signal at either one or both of the input terminals 63 produces a corresponding output signal at terminal 69.

FIG. 7

This figure illustrates an AND circuit including two grounded base stages 67 connected in parallel to a common load resistor 68. Output terminals 69 and 70 are connected to the opposite terminals of the load resistor 68. Terminal 70 is grounded.

Each of the grounded base stages 67 comprises an NPN junction transistor 71 including an emitter 71*a*, a base 71*b*, and a collector 71*c*. The collectors 71*c* are connected in parallel to resistor 68. Each base 71*b* is connected through a biasing battery 72 to ground. Each emitter 71*e* is connected through a resistor 73 to a signal input terminal 74 and is also connected through a resistor 75 and a biasing battery 76 to ground. A cooperating signal input terminal 75 is grounded.

OPERATION OF FIG. 7

In the grounded base stages 67, when the emitter 71*e* is below —5 volts, the transistor becomes a low impedance from the collector to the base and when the emitter 71*e* is more positive than —5 volts, the transistor is a high impedance from collector to base.

Assuming the signal input potential to be 0 volt and the no signal potential to be —5 volts, it may be seen that as long as either input terminal 74 is at —5 volts, then its associated transistor will be in its low impedance condition, and the output terminal 69 will be at —5 volts. When both input terminals 74 go to their signal values of 0 volt, then both resistors 71 are in their high impedance conditions, there is substantially no current flow through resistor 68, and output terminal 69 remains at substantially 0 volt. This is typical AND circuit operation. By reversing the significance of the no signal and signal potentials, it may be seen that OR circuit operation will be secured.

While I have shown and described certain preferred embodiments of my invention, other modifications thereof will readily occur to those skilled in the art, and I therefore intend my invention to be limited only by the appended claims.

I claim:

1. A logical circuit for producing an output signal in response to a predetermined combination of concurrent signals at a plurality of inputs, comprising at least one emitter follower stage including a junction transistor, at least one inverter stage including a junction transistor, a common load for both said stages, output terminal means connected to said common load, and a plurality of input terminal means, one connected to each of said transistors at an electrode thereof spaced from the load connection thereto.

2. A logical circuit as defined in claim 1, in which said stages are connected in parallel to said common load.

3. A logical circuit as defined in claim 1, in which said stages are connected in series to said common load.

4. A logical circuit as defined in claim 1, in which one of said transistors is a PNP junction transistor and the other is a NPN transistor.

5. A logical circuit as defined in claim 1, in which the circuit produces a signal at its output terminal in response to the presence of an input signal at one of its input terminals and the concurrent absence of a signal at the other input terminal.

6. A logical circuit as defined in claim 1, in which the circuit produces a signal at its output terminal in response to either the presence of a signal at one of its input terminals or the absence of a signal at the other input terminal.

7. A logical circuit as defined in claim 1, in which the transistor in said emitter follower stage is a PNP transistor, the transistor in said inverter stage is an NPN transistor, and said stages are connected in parallel.

8. A logical circuit as defined in claim 1, in which the transistor in said emitter follower stage is an NPN transistor, the transistor in said inverter stage is a PNP transistor, and said stages are connected in series with said common load.

9. A logical circuit as defined in claim 1, in which the transistor in said emitter follower stage is an NPN transistor, the transistor in said inverter stage is a PNP transistor, and said stages are connected in parallel to said common load.

10. A logical circuit as defined in claim 1, in which the transistor in said emitter follower stage is a PNP transistor, the transistor in said inverter stage is an NPN transistor, and said transistors are connected in series with said common load.

11. A logical circuit for producing an output signal in response to a predetermined combination of signals at a plurality of inputs comprising at least two grounded base stages, each comprising a junction transistor, a common load connected to both said transistors in parallel, output terminal means connected to said common load, and a plurality of input terminal means, each connected to the emitter of the transistor in one of said grounded base stages.

12. A logical circuit as defined in claim 11, in which each said stage comprises a PNP junction transistor.

13. A logical circuit as defined in claim 11, in which each said stage comprises an NPN junction transistor.

14. A logical circuit for producing an output signal in response to a predetermined combination of concurrent signals at a plurality of inputs, comprising at least one emitter follower stage including a first junction transistor having an input electrode, an output electrode, and a base electrode, at least one inverter stage including a second junction transistor having an input electrode, an output electrode and a base electrode, a common load for both said stages, means direct-current-current-conductively connecting both said output electrodes to said common load, output terminal means connected to said common load, a plurality of input terminal means, corresponding in number to the number of transistors and means connecting the respective input terminal means to the respective input electrodes of the transistors.

15. A logical circuit for producing an output signal in response to a predetermined combination of concurrent signal and no-signal conditions at a plurality of inputs, comprising a number of emitter follower stages equal to the number of signal conditions in said predetermined combination, each said emitter follower stage including a junction transistor having an emitter electrode, a collector electrode and a base electrode, all the transistors of the emitter follower stages being of the same symmetrical type, a number of inverter stages equal to the number of no-signal conditions in said predetermined combination, each said inverter stage including a junction transistor having complementary symmetry with the transistors in the emitter follower stages, each said inverter stage transistor having an emitter electrode, a collector electrode, and a base electrode, a common load impedance, means direct-current-conductively connecting the load impedance to the collector electrodes of the inverter stages and to the emitter electrodes of the emitter follower stages, output terminal means connected to said common load impedance, a plurality of input terminal means equal in number to the total number of said conditions, means connecting the respective input terminal means corresponding to the signal conditions in said combination to the base electrodes of the respective emitter-follower stages, means connecting the respective input terminal means corresponding to the no-signal conditions in said combination to the base electrodes of the respective inverter stages, and means connecting the emitter electrodes of the inverter stages and the collector electrodes of the emitter follower stages to a common junction.

References Cited in the file of this patent

UNITED STATES PATENTS

| | | |
|---|---|---|
| 2,627,039 | MacWilliams | Jan. 27, 1953 |
| 2,652,460 | Wallace | Sept. 15, 1953 |
| 2,722,649 | Immel et al. | Nov. 1, 1955 |
| 2,724,780 | Harris | Nov. 22, 1955 |
| 2,728,857 | Sziklai | Dec. 27, 1955 |
| 2,770,728 | Herzog | Nov. 13, 1956 |
| 2,790,077 | Hinckley et al. | Apr. 23, 1957 |
| 2,831,126 | Linvill et al. | Apr. 15, 1958 |
| 2,844,764 | Wyckoff | July 22, 1958 |